Jan. 9, 1940.   S. WEIN   2,186,085
METHOD OF MAKING SELENIUM RECTIFIER FILMS
Filed April 22, 1938
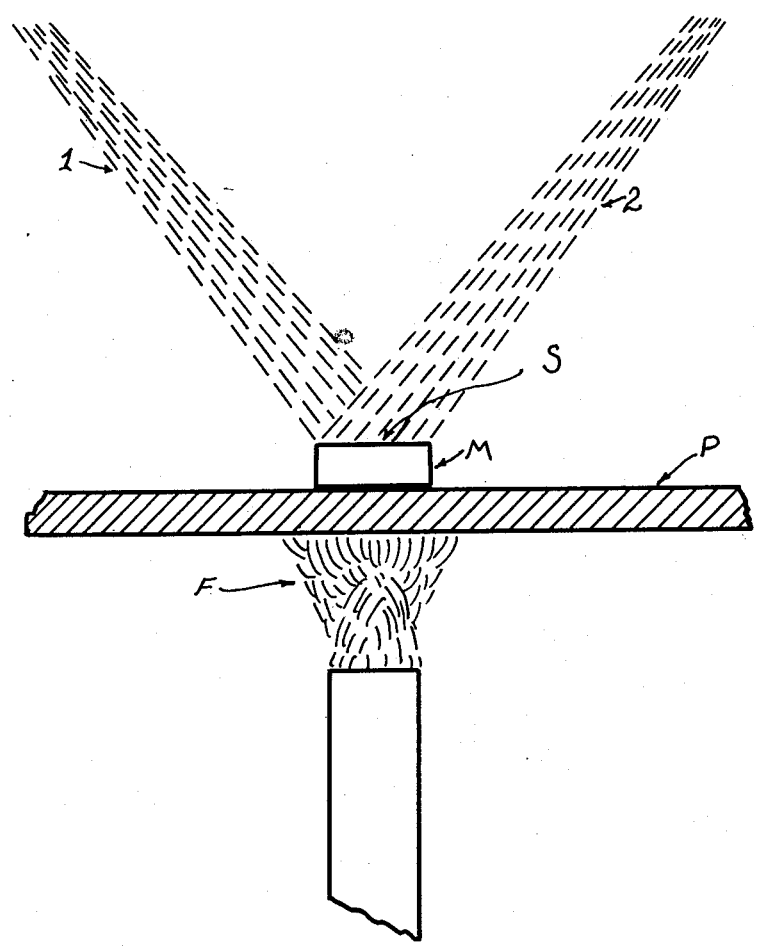
SAMUEL WEIN
INVENTOR Patented Jan. 9, 1940

2,186,085

UNITED STATES PATENT OFFICE 2,186,085

METHOD OF MAKING SELENIUM RECTIFIER FILMS

Samuel Wein, New York, N. Y., assignor to The B-L Electric Manufacturing Co., St. Louis, Mo.

Application April 22, 1938, Serial No. 203,614

10 Claims. (Cl. 175—366)

This invention relates to a method of production of selenium coatings suitable for rectifiers, photo-cells, thermo-couples, etc.

The process herein set forth is described specifically in relation to the steps necessary for the deposition, upon plates, of a coating of selenium suitable for use as an element of a rectifier, or as a light sensitive cell, or thermo-couple. However, it is understood that this process may be applied for other purposes and for the formation of coatings of selenium upon other members, and, in modified form, for the deposition, in similar fashion, of substances other than selenium, for the same and similar uses.

The use of selenium-coated plates as portions of rectifiers for light sensitive cells and as an element of thermo-couples, is well known in the arts. The customary manner of manufacture for such coated members has been to heat a metal plate, such as iron, and then to sprinkle powdered selenium upon the plate, at a temperature sufficient to melt the selenium, but not to burn it. The necessary result of such a method was a non-uniform deposit upon the surface of the plate to be coated; furthermore, some of the plate area, might, under certain conditions, be left bare by such a process.

In the accompanying drawing the single figure diagrammatically illustrates one form of apparatus for practicing the invention.

It is an object of this invention to provide a method of producing selenium-coated plates, or members coated or impregnated with metals, or similar elements, in which the precipitation of the element or metal is produced in an atmosphere of a gas, or in a liquid solution, the precipitate being cast upon a plate, or like member, and the solution then being evaporated to leave upon the plate a deposit of the desired element or metal only. In such cases, where the metal or element permits, the temperature of the plate may be maintained at such degree that the deposit will be fused upon the plate to form a coating thereon.

It is an object of the invention to provide a method of depositing a coating of selenium to produce a selenium coating on members for use in rectifiers or in light sensitive members, or for similar purposes, in which the coating is produced by moistening a surface of a member with selenious acid, either while the member is retained in an atmosphere of sulphur dioxide, or by subjecting the member, immediately after moistening, to the action of sulphurous acid or sulphur dioxide.

In a preferred embodiment of the invention, the production of the selenium-coated plate will be effected by spraying the selenious acid in solution, or selenium dioxide with some moisture, against the member to be coated, which is heated. The spraying medium, in such case, is preferably sulphur dioxide, in a gaseous state, which may be used to aspirate the selenious acid, or the selenium dioxide, carrying fluid from a container therefor.

For example, the object M to be coated may rest upon a heatable platform P against the under side of which a heating flame such as that from a Bunsen burner may be applied. 1 indicates a spray of selenious acid in solution and 2 indicates a jet or spray of sulphur dioxide either in gaseous form or mixed with some of the selenious acid in solution. Both sprays are directed against the surface S of the member M which is desired to be coated. Although the platform P is shown in the drawing to be horizontal, this is not necessary.

By this procedure the selenious acid composition is thrown onto the metal plate, and sulphur dioxide or sulphurous acid added thereto. A reduction reaction occurs between the sulphurous acid and the selenious acid in the solution to produce sulphuric acid and elemental, red, amorphous selenium which may be caused to adhere to the metal plate upon which it is thrown. The water and sulphuric acid are removed and there is thus produced a plate having thereon a thin layer of selenium on the surface thereof. This selenium may be treated in various ways to control its physical character according to the purpose to which it is later to be put. This treatment is usually a heat treatment in the presence or absence of other substances, the details of which vary according to the expected use. The coated plate may then be combined with a second conductor member to produce a highly efficient rectifier; or it may be protected with a suitable transparent or translucent cover to produce a photo-cell, etc.

Thus an object of the invention is to precipitate a thin layer of elemental selenium directly upon a plate.

Another object of the invention is to precipitate a thin layer of selenium upon a metal plate for combination with a second conductor to produce a rectifier.

Still another object of the invention is to precipitate a layer of selenium upon a conductor system suitable for a light responsive electric conduction.

Other objects of this invention will be hereinafter set forth, or will be apparent from the description, in which are indicated a number of forms wherein the invention may be embodied.

The invention, however, is not intended to be restricted to the particular steps or uses, nor to the particular applications of the products described herein, nor to the various details thereof, as the same may be modified in various particulars or be applied in many varied relations without departing from the spirit and scope of the invention, the practical embodiments described being merely attempts to show some of the various forms in which the invention might be practised.

Selenium acid is obtainable in the form of a solid, which is definitely hygroscopic and dissolves readily in water. The selenium may be precipitated in the elemental form from the water solution by the addition of a reducing agent such as sulphur dioxide or sulphurous acid. This reaction occurs in the cold but takes place more rapidly if the solutions are warm or hot. The precipitation is also hastened by the presence of suitable catalysts such as small quantities of hydrochloric or sulphuric acid. The precipitate is in the form of a red amorphous selenium which may be caught upon any desired support. The red amorphous selenium may be given a heat treatment at a slightly elevated temperature which may conveniently be in the neighborhood of 165° C. The first result of the heating is the conversion of the selenium into the black form and upon prolonged heating such as for a period of three hours, the selenium is converted to the gray metallic variety. This variety, upon a conductor such as an iron plate which is the preferable support, or upon a copper, silver or other plate may be combined with an appropriate second electrode such as an aluminum, lead, tin or alloy plate to produce a highly efficient rectifier; or if the initial plate is properly prepared, the selenium may be used directly for a light responsive cell structure.

In the carrying out of the invention involved herein, it is preferred that the reducing agent used be such that, upon the application of heat, such reducing agent would be eliminated by evaporation, leaving deposited only the red amorphous selenium which, upon heating, would be converted into the desired grey metallic variety.

Because of the facility with which the method may be applied, it is preferred to produce the selenium coated member by spraying a solution of selenious acid against a face of the member to be coated, the spraying being carried out either in a closed chamber in which sulphur dioxide is the gaseous medium, or by simultaneously spraying on the surface, with the selenious acid, a solution of sulphurous acid, preferably containing a little hydrochloric or sulphuric acid, or by spraying the selenious acid, using gaseous sulphur dioxide as the aspirating medium, or by spraying selenium dioxide and a solution of sulphurous acid simultaneously or selenium dioxide and sulphur dioxide in a very humid atmosphere.

In the first case, the spray of selenious acid, as it flies through the atmosphere of sulphur dioxide, will absorb some of the gas, resulting in the precipitation, either while still flying through the gas, or immediately upon impacting the member, of the red amorphous selenium. The member, in such case, preferably is maintained at such temperature that the liquid forming part of the solution is, immediately after impact, quickly evaporated to leave adhering to the member, on the red amorphous selenium. This, by proper control of the temperature of the member, fuses, and is converted into the black variety, and, in time, to the grey metallic selenium. As the solution of selenious acid and the sulphur dioxide consist entirely of volatile substances, except for the selenium, everything but the selenium is completely evaporated.

In the second case, the selenious and sulphurous acids react immediately upon their impact, whereupon evaporation leaves, likewise, only the selenium.

In the third case, the reaction is substantially the same as that which occurs in the first case, except, probably, that the precipitation of the selenium is much more instantaneous.

In the fourth case, the selenium dioxide becomes moistened as it moves along through space and then is acted upon by the sulphur dioxide or the sulphurous acid to produce the precipitate.

The invention may also be applied as a number of distinct steps as, for instance, by first spraying upon, or otherwise moistening, the surface to be coated, a solution either of selenious or of sulphurous acid. Then, in either case, a solution of the other acid is sprayed or otherwise deposited upon the surface. If selenious acid be first applied, the moistened member may then be transferred into a chamber containing sulphur dioxide. In all of these cases, the plates seem to require sufficient wetting so that the selenious acid be not crystallized before the sulphur dioxide reacts with it. An excess of sulphur dioxide is also required in order that no selenious acid be left unreacted.

It is also to be understood that, while it is desirable that the member to be coated be heated at the moment of depositing thereupon the precipitating substances, it is also within the scope of the invention first to apply the precipitating substances, and thereafter to subject the member and the applied substances to sufficient heat to produce the desired transformation as well as to evaporate preferably all substances but the precipitate. In any of these cases, there results, as the moist surface becomes uniformly wet with the solution throughout its extent, a deposit, uniform throughout its extent, of a uniform amount of the precipitated selenium. The precipitated selenium is, of course, extremely fine and lends itself admirably to the desired uniformity of deposit and the subsequent heat treatment.

As the plate or tablet, upon which the selenium is applied, there may be used an iron plate; any other substance, however, capable of receiving the coating, may be used.

The invention also may be applied for the production of coatings of metals, or the like, in which case the precipitants would likewise consist of easily evaporated substances, leaving no solid particles other than the metal or like substance intended to be deposited.

Many other changes could be effected in the particular methods of operation set forth, and in the specific steps or details thereof, without substantially departing from the invention hereof which is intended to be defined in the accompanying claims, the specific description hereinabove being set forth merely to illustrate operative embodiments for carrying out the spirit of the invention.

What is claimed as new and useful is:

1. The method of producing a selenium coating upon a member which includes the step of spraying some of the surface of said member with a solution of selenious acid and reducing the selenious acid to elemental selenium by the application to the selenious acid on said member of a reducing agent.

2. The method of producing a selenium coating upon a member, which includes the steps of heating the member, moistening the member with a solution of selenious acid, and subjecting the moistened member to the action of a reducing agent comprising sulphur dioxide.

3. The method of producing a selenium coating upon a member, which includes the steps of moistening a surface of a heated member with a solution of selenious acid, and subjecting the moistened member to the action of a volatile reducing agent.

4. The method of producing a selenium coating upon a member, which includes the steps of spraying a heated member with a solution of selenious acid in an atmosphere of sulphur dioxide.

5. The production of members having a coating of a light sensitive substance, in which a heated plate is sprayed with solutions of selenious and sulphurous acids.

6. The method of producing a selenium-coated member, which includes the steps of moistening a member with a solution of selenious acid, and subjecting the moistened member to the action of a reducing agent, the products of the reaction being volatile except for a precipitate of selenium and thereafter heat treating the precipitate in situ to convert it into a different form of elemental selenium.

7. The method of producing a selenium-coated member, which includes the steps of moistening a member with a solution of selenious acid, and subjecting the moistened member to the action of a reducing agent, the products of the reaction being volatile except for a precipitate of selenium and thereafter heat treating the precipitate in situ to convert it into a different form of elemental selenium, the final form being the grey metallic crystalline form.

8. The method of producing a selenium-coated member, which includes the steps of moistening a member with a solution of selenious acid, and subjecting the moistened member to the action of a reducing agent, the products of the reaction being volatile except for a precipitate of selenium, thereafter heat treating the precipitate in situ to convert it into a different form of elemental selenium, the final form being the grey metallic crystalline form, and thereafter combining with the layer another conductor whereby the combination is unilaterally conductive.

9. A rectifier device comprising a conductor plate, a coating thereon of selenium produced in situ by direct precipitation thereon and heat treated thereon and a second electrode in contact with the selenium.

10. A rectifier comprising an iron plate member, a layer of selenium adherent thereto by direct precipitation thereon in the presence of sulphur dioxide and a catalyst and heat treated for conversion into the metallic crystalline form and a second electrode thereon comprising a soft metal selected from the group of aluminum, lead or tin either singly or in combination.

SAMUEL WEIN.